(12) United States Patent
Zellweger et al.

(10) Patent No.: US 8,213,879 B2
(45) Date of Patent: Jul. 3, 2012

(54) RADIO-FREQUENCY SIGNAL RECEPTION AND/OR TRANSMISSION DEVICE WITH NOISE REDUCTION

(75) Inventors: Emil Zellweger, Lommiswil (CH); Arnaud Casagrande, Lignieres (CH)

(73) Assignee: The Swatch Group Research and Development Ltd, Marin (CH)

( * ) Notice: Subject to any disclaimer, the term of this patent is extended or adjusted under 35 U.S.C. 154(b) by 869 days.

(21) Appl. No.: 12/282,303

(22) PCT Filed: Mar. 9, 2007

(86) PCT No.: PCT/EP2007/052241
§ 371 (c)(1),
(2), (4) Date: Sep. 9, 2008

(87) PCT Pub. No.: WO2007/101885
PCT Pub. Date: Sep. 13, 2007

(65) Prior Publication Data
US 2009/0098835 A1    Apr. 16, 2009

(51) Int. Cl.
*H04B 1/40* (2006.01)
*H04B 1/38* (2006.01)
(52) U.S. Cl. ............... 455/86; 455/76; 455/73; 455/118
(58) Field of Classification Search .................... 455/76, 455/86
See application file for complete search history.

(56) References Cited

U.S. PATENT DOCUMENTS

| | | | |
|---|---|---|---|
| 5,574,994 A * | 11/1996 | Huang et al. .................. | 455/126 |
| 5,802,462 A * | 9/1998 | Lautzenhiser ................ | 455/208 |
| 6,421,530 B1 | 7/2002 | Adachi et al. | |
| 6,757,527 B1 * | 6/2004 | Dahlback et al. ............. | 455/255 |

(Continued)

FOREIGN PATENT DOCUMENTS
JP    05244032    9/1993
(Continued)

OTHER PUBLICATIONS
International Search Report issued in corresponding application No. PCT/EP2007/052241, completed Jun. 22, 2007 and mailed Jul. 2, 2007.
(Continued)

*Primary Examiner* — Temesgh Ghebretinsae
*Assistant Examiner* — Gennadiy Tsvey
(74) *Attorney, Agent, or Firm* — Griffin & Szipl, P.C.

(57) ABSTRACT

The radio-frequency signal reception and/or transmission device includes an antenna (8) for picking up or transmitting radio-frequency signals, a bandpass filter (9), at least one low noise amplifier (11) for amplifying the filtered signals, an oscillator stage (1) for generating first high frequency signals ($S_{VCO}$), at least one frequency divider (14) for dividing by M the frequency of the first signals in order to generate second high frequency signals ($S_D$), where M is an integer number greater than 1, at least a first mixer unit (12) for mixing the filtered and amplified radio-frequency signals ($S_R$) with the first high frequency signals ($S_{VCO}$), and at least a second mixer unit (13) for mixing the intermediate signals supplied by the first mixer unit with the second high frequency signals in order to produce baseband signals ($I_R$, $Q_R$). The stage oscillator (1) is configured to generate first high frequency signals ($S_{VCO}$), whose frequency is outside the frequency band of the bandpass filter and higher than the frequency of the received radio-frequency signals by a factor M/N comprised between 1 and 2, where N is an integer number greater than 1.

6 Claims, 3 Drawing Sheets

U.S. PATENT DOCUMENTS

| | | | |
|---|---|---|---|
| 7,542,731 B2 * | 6/2009 | Park et al. | 455/84 |
| 2002/0164965 A1 * | 11/2002 | Chominski et al. | 455/118 |
| 2004/0131127 A1 * | 7/2004 | Nadiri et al. | 375/271 |
| 2004/0248531 A1 * | 12/2004 | Takaki | 455/131 |
| 2005/0017887 A1 | 1/2005 | Nagaso et al. | |
| 2005/0117664 A1 * | 6/2005 | Adan et al. | 375/316 |
| 2006/0097801 A1 * | 5/2006 | Adan | 331/46 |
| 2006/0141952 A1 * | 6/2006 | Kung et al. | 455/102 |

FOREIGN PATENT DOCUMENTS

| | | |
|---|---|---|
| WO | 03/009483 A1 | 1/2003 |

OTHER PUBLICATIONS

International Preliminary Report on Patentability with verified, translated claims, completed Jul. 10, 2008.

* cited by examiner

RADIO-FREQUENCY SIGNAL RECEPTION AND/OR TRANSMISSION DEVICE WITH NOISE REDUCTION

This is a National Phase Application in the United States of International Patent Application No. PCT/EP2007/052241 filed Mar. 9, 2007, which claims priority on European Patent Application No. 06110899.9, filed Mar. 9, 2006. The entire disclosures of the above patent applications are hereby incorporated by reference.

FIELD OF THE INVENTION

The invention concerns a low power radio-frequency signal reception and/or transmission device with noise reduction. A dual frequency conversion is carried out in the device so as to lower the frequency of the received radio-frequency signals or to increase the frequency of baseband signals to be transmitted. In order to do this, the device includes a bandpass filter connected to a radio-frequency signal reception or transmission antenna, at least one low noise amplifier for amplifying the received or transmitted signals, and first and second mixer units for carrying out a dual frequency conversion using high frequency signals generated by an oscillator stage and a divider element.

BACKGROUND OF THE INVENTION

A dual frequency conversion for lowering the received radio-frequency signals to a baseband frequency is generally necessary. This avoids certain problems of disturbance in the case of a single frequency conversion when the radio-frequency signals are received or transmitted.

US Patent Application No. 2005/0017887 discloses just such a radio-frequency signal reception and transmission device, able to perform a dual frequency conversion to lower the frequency of the received radio-frequency signals with a single antenna to a baseband frequency. A dual frequency conversion is also performed to generate radio-frequency signals to be transmitted by the same antenna on the basis of baseband signals.

With a single frequency conversion, the high frequency signals generated by the oscillator stage and supplied to the mixer unit must have a substantially equal frequency to the frequency of the radio-frequency signals. Disturbance signals at harmonic frequencies to the frequency of the radio-frequency signals may be produced. Since the isolation of the mixer is limited, reverse disturbance radiation of the high frequency signals may occur in the direction of the antenna in the radio-frequency signal reception mode. This reverse radiation of equal frequency to the radio-frequency signal frequency is thus not filtered by the input bandpass filter. Moreover, in transmission mode, the radio-frequency signals produced at the equivalent frequency to the high frequency signals from the oscillator stage can influence the oscillator stage. Because of the radiation from the transmitted radio-frequency signals, a voltage controlled oscillator of an oscillator stage is liable to generate high frequency signals of higher frequency than the desired value.

During frequency conversion in a radio-frequency signal reception/transmission device, a problem of noise has been observed, linked, on the one hand, to the amplifier and mixer unit, and on the other hand to the image frequency during frequency conversion. This image frequency is liable to disturb the useful data signals to be removed from the radio-frequency signals picked up, particularly during conversion from a high frequency to a low frequency. The image frequency signal gain at the output of the mixer unit is generally greater than the useful data signal gain, which may complicate the processing of the information contained in the radio-frequency signals picked up.

Several embodiments of radio-frequency signal reception and/or transmission devices have already been proposed in the past for reducing part of the noise, in particular during frequency conversion of the radio-frequency signals picked up. In this regard, one could cite WO Patent Application No 03/009483 which discloses a device of this type for receiving and transmitting radio-frequency signals whose frequency may be equal to 2 GHz and 5 GHz using two filter antennas. During the dual frequency conversion operations, a specific architecture is achieved for one of the mixer units so as to remove the image frequency of the converted signals. A voltage controlled oscillator is arranged for generating first high frequency signals whose frequency is comprised between 2 and 5 GHz such that after the first frequency conversion, the intermediate frequency signal is close to 1.5 GHz.

This solution proposed in WO 03/009483 considerably complicates the structure of this type of radio-frequency signal reception and/or transmission device for removing or attenuating the image frequency disturbance signals. The frequency of the first high frequency signals is only determined to be within the two radio-frequency signal frequencies to be picked up or transmitted. This type of radio-frequency signal reception and transmission device consumes a great deal of electric energy. Consequently, it cannot be fitted to a small portable instrument powered by a battery or electrical energy accumulator.

Like the previous document, JP Patent No 05-244032 discloses a radio-frequency signal communication device with a dual frequency band. For receiving radio-frequency signals, the device includes a first bandpass filter (810 to 826 MHz) and a second bandpass filter (1501 to 1513 MHz), which are connected to the same reception antenna in order to filter radio-frequency signals whose frequency is within the frequency band of the first filter or within the frequency band of the second filter. A first frequency conversion of the received and filtered radio-frequency signals is performed by a first mixer unit using first high frequency signals whose frequency is close to a mean value between the frequencies of the signals filtered by the first or second bandpass filters. In this manner, the frequency of the intermediate signals is at a value close to 344 MHz.

The solution proposed in JP Patent No 05-244032 also greatly complicates the structure of this communication device in particular by using several bandpass filters. This device provides no solution for reducing noise linked to the image frequency. The frequency value of the first high frequency signals mixed with the received and filtered radio-frequency signals is chosen only so that the frequency of the intermediate signals at the output of the first mixer is always the same. Consequently no particular means are provided simply for reducing the noise linked to the image frequency. Moreover, a communication device of this type uses a great deal of electrical energy, and thus cannot be fitted to a small portable instrument powered by a battery or an electrical energy accumulator.

It is thus a main object of the invention to provide a low power radio-frequency signal reception and/or transmission device of simple design for easily reducing the noise mainly linked to the image frequency of the converted signals in order to overcome the aforecited drawbacks of the prior art. Moreover, as many as possible of the elements of the simply structured device must be able to be integrated in a single integrated circuit for the sake of saving space.

SUMMARY OF THE INVENTION

The invention therefore concerns an aforecited low power radio-frequency signal reception and/or transmission device which is characterized in that the oscillator stage is configured so as to generate first high frequency signals, whose frequency is outside the frequency band of the bandpass filter and greater by a factor M/N comprised between 1 and 2 than the frequency of the received radio-frequency signals, where N is an integer number greater than 1.

One advantage of the reception and/or transmission device according to the invention lies in the fact that, a large reduction in the noise generated by an image frequency at the input of the first mixer unit is obtained, by generating first high frequency signals, whose frequency is greater than the frequency of the received radio-frequency signals by a determined factor. In this manner, the useful signals are less disturbed in order to facilitate subsequent demodulation operations.

Preferably, the frequency of the first high frequency signals is greater than the frequency of the radio-frequency signals picked up by a factor of 4/3. After the first frequency conversion, the intermediate signals obtained thus have a frequency of a 1/3 the value of the frequency of the radio-frequency signals. This means that a second frequency conversion can easily be performed using second high frequency signals whose frequency is divided by 4 relative to the frequency of the first signals. Baseband signals, i.e. with a carrier frequency close to 0, are thus obtained after two frequency conversion operations using a simple structure and greatly reducing the noise linked to the image frequency.

Advantageously, the structure of the reception and/or transmission device is achieved with a reduced number of components without any particular shield. Most of the low power device can easily be integrated in a single integrated circuit, for example made in 0.25 μm CMOS technology. Consequently, with the exception of the bandpass filter and a quartz crystal for the oscillator stage, all of the other elements are integrated in the integrated circuit. However, since the integrated low noise amplifier preceding the first mixer unit is one of the causes of the image frequency it is thus advantageous for the oscillator stage to generate high frequency signals at a higher frequency than the radio-frequency signal frequency.

BRIEF DESCRIPTION OF THE DRAWINGS

The objects, advantages and features of the low power radio-frequency signal reception and/or transmission device will appear more clearly in the following description of embodiments illustrated by the drawings, in which.

DETAILED DESCRIPTION OF THE ILLUSTRATIVE EMBODIMENTS

In the following description, the elements of the low power device for receiving and/or transmitting radio-frequency signals which are well known to those skilled in the art in this technical field are only related in a simplified manner. This device could be used in various applications, such as in a cell telephone in a telecommunications system for example, or also for receiving GPS type signals for navigation operations.

Figure 1:
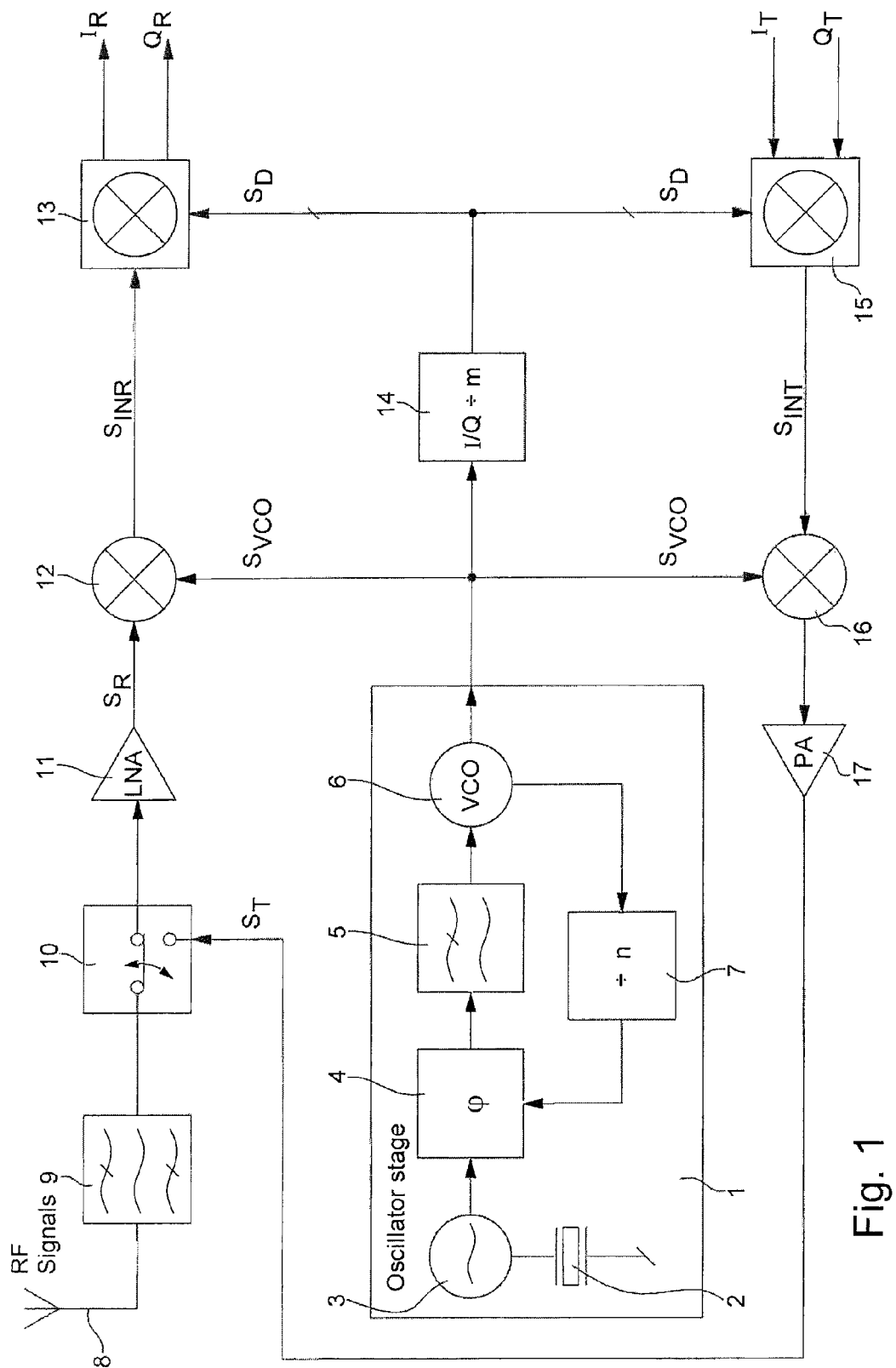
FIG. 1 shows a first embodiment of a radio-frequency signal reception and/or transmission device according to the invention.

FIG. 1 shows a radio-frequency signal reception and/or transmission device according to the invention in a simplified manner illustrating, in particular, the input stage for frequency conversion operations on the signals that are picked up or transmitted. In order to do this, said device includes, first of all, an antenna 8 for receiving or transmitting radio-frequency RF signals, and a bandpass filter 9, which may be preceded by a low noise amplifier (not shown). This filter may be a selective SAW (surface acoustic wave) type bandpass filter. The bandpass filter is directly connected to a switch element 10 that can be controlled to place the device in a radio-frequency RF signal reception mode as shown in FIG. 1, or in a radio-frequency signal $S_T$ transmission mode.

For the reception of radio-frequency signals RF, the device also includes, after switch element 10, a low noise amplifier LNA 11 for amplifying the radio-frequency signals filtered by filter 9, and a first mixer unit 12 for performing a first frequency conversion operation. The filtered and amplified signals $S_R$ are mixed in the first mixer unit with first high frequency signals $S_{VCO}$ generated by an oscillator stage 1. The intermediate signals $S_{INR}$ thus produced by the first mixer unit 12 are mainly signals whose frequency is equal to the subtraction between the carrier frequency of filtered radio-frequency signals $S_R$ and the frequency of the first high frequency signals $S_{VCO}$.

Of course, according to the invention, in order to reduce the noise relating to the image frequency at the input of the first mixer unit 12 caused in part by amplifier 11, oscillator stage 1 is configured to generate first high frequency signals $S_{VCO}$ whose frequency is determined to be greater than the carrier frequency of the filtered and amplified radio-frequency signals $S_R$ by a factor of M/N. N and M are integer numbers where M is greater than N but less than 2N so that factor M/N is comprised between 1 and 2. The number M is preferably a multiple of 2. The frequency of the first high frequency signals must also be outside the frequency range of input bandpass filter 9. This avoids having high frequency signal radiation through the bandpass filter and the antenna in reception mode, since mixer unit 12 has limited isolation.

According to a preferred embodiment of the device, oscillator stage 1 is configured to generate first high frequency signals whose frequency is substantially equal to 4/3 the frequency of filtered and amplified signals $S_R$. In this way, for the second frequency conversion operation, it is possible to generate second high frequency in-phase and in-quadrature signals $S_D$ on the basis of the first high frequency signals using a master-slave divider 14 of simple design, for example a divider-by-4.

Figure 2:
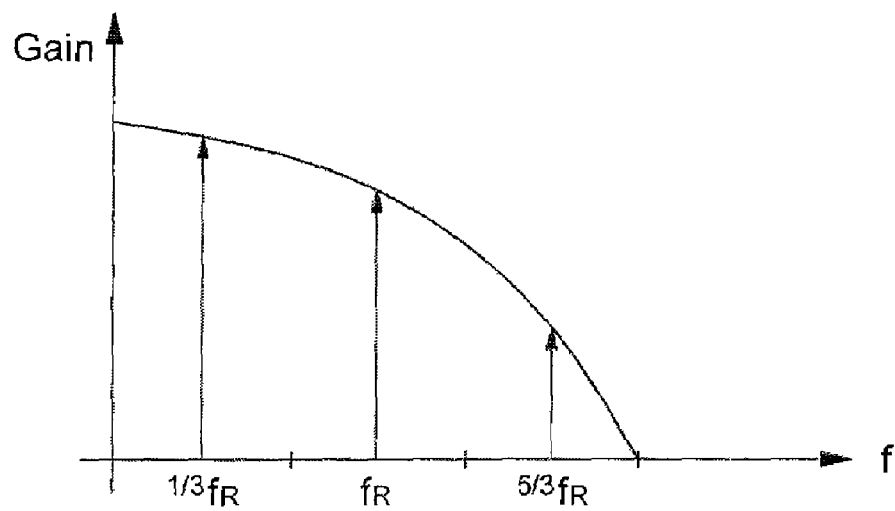
FIG. 2 shows two graphs of the gain and noise of the amplified and converted signals at the output of the first mixer unit showing the level of disturbance signals at an image frequency as a function of the frequency of the first high frequency signals generated by the oscillator stage.
Figure 2:
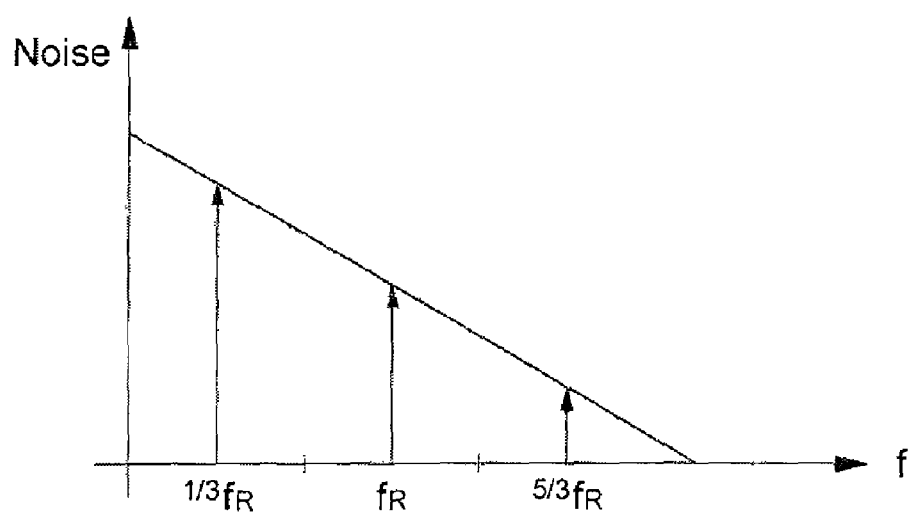

FIG. 2 illustrates well the advantage of generating first high frequency signals at a higher frequency than the frequency of the received radio-frequency signals in order to reduce the influence of noise related to the image frequency at the input of the first mixer unit. According to the invention, the value of the image frequency at the input of the first mixer unit, which is partly caused by the low noise amplifier, is 5/3 the frequency $f_R$ of the radio-frequency signals when the frequency of the first high frequency signals is fixed at 4/3 of the frequency of the radio-frequency signals. However, the value of the image frequency at the output of the first mixer unit is ⅓ of the frequency $f_R$ of the radio-frequency signals when the frequency of the first high frequency signals is conventionally fixed at ⅔ of the frequency of the radio-frequency signals. Consequently, it will be noted that according to the invention, the gain and noise level of the image frequency signals are much less than those of a conventional solution using first high frequency signals whose frequency is lower than the frequency of the radio-frequency signals picked up.

In the conventional solution, the detrimental noise relative to the image frequency is of the order of 4.5 dB, whereas according to the invention, this detrimental noise is only 1.5 dB. Thus, a large reduction of 3 dB is obtained in this detrimental noise relative to the useful signals amplified by the low noise amplifier. This is a considerable advantage in a low power device, for which it is very important to minimise noise relative to the useful signals. A decrease of even 0.5 dB in noise during reception of the radio-frequency signals is already difficult to obtain whatever the architecture of the device. Moreover, with a reduced number of components, the low power device according to the invention can easily demodulate the data contained in the radio-frequency signals picked up. This low power device can thus be fitted to an instrument of small size, such as a wristwatch or portable telephone.

It should also be noted that selecting a frequency for the first high frequency signals that is higher than the radio-frequency signal frequency by a factor comprised between 1 and 2, prevents harmonic frequencies being generated during frequency conversion.

With reference to FIG. 1, oscillator stage 1 of the device includes mainly a frequency synthesiser with a voltage controlled oscillator VCO 6 for generating the first high frequency signals $S_{VCO}$. This oscillator stage 1 further includes a reference oscillator unit 3 with a quartz crystal 2, a phase and frequency detector 4 for comparing the frequency of the reference signals of oscillator 3 to the frequency of the signals from the voltage controlled oscillator VCO 6, which is divided by a factor n in divider 7. The control signals exiting detector 4 are filtered by a low pass filter 5 to produce a control voltage for the voltage controlled oscillator 6 as a function of the comparison of the signals supplied to said detector 4.

The frequency of the reference signals from oscillator 3 may be of the order of 8 MHz, whereas the frequency of the first high frequency signals may be of the order of 1.2 GHz. This high frequency only minimally increases the power consumption of the device compared to a conventional frequency of the order of 600 MHz. The device may be capable of picking up radio-frequency signals with a carrier frequency close to 900 MHz depending upon the frequency range defined by bandpass filter 9.

The device further includes a second mixer unit 13 for performing a second frequency conversion operation on intermediate signals $S_{INR}$. This second mixer unit 13 is formed of two mixers (not shown) for respectively mixing the second high frequency signals respectively in-phase and in-quadrature with intermediate signals $S_{INR}$. The signals produced by the two mixers of the second mixer unit 13 are signals whose frequency is equal to the subtraction between the frequency of intermediate signals $S_{INR}$ and the frequency of the second high frequency signals $S_D$. As in the preferred embodiment of the invention, the frequency of the second high frequency signals is substantially equal to the carrier frequency of the intermediate signals, the two output signals in-phase $I_R$ and in-quadrature $Q_R$ are baseband signals with a carrier frequency close to 0.

Of course, a controlled gain amplifier could be provided at the output of second mixer unit 13, followed by an analogue/digital converter so as to supply sampled and quantified output signals $I_R$ and $Q_R$.

Figure 3:
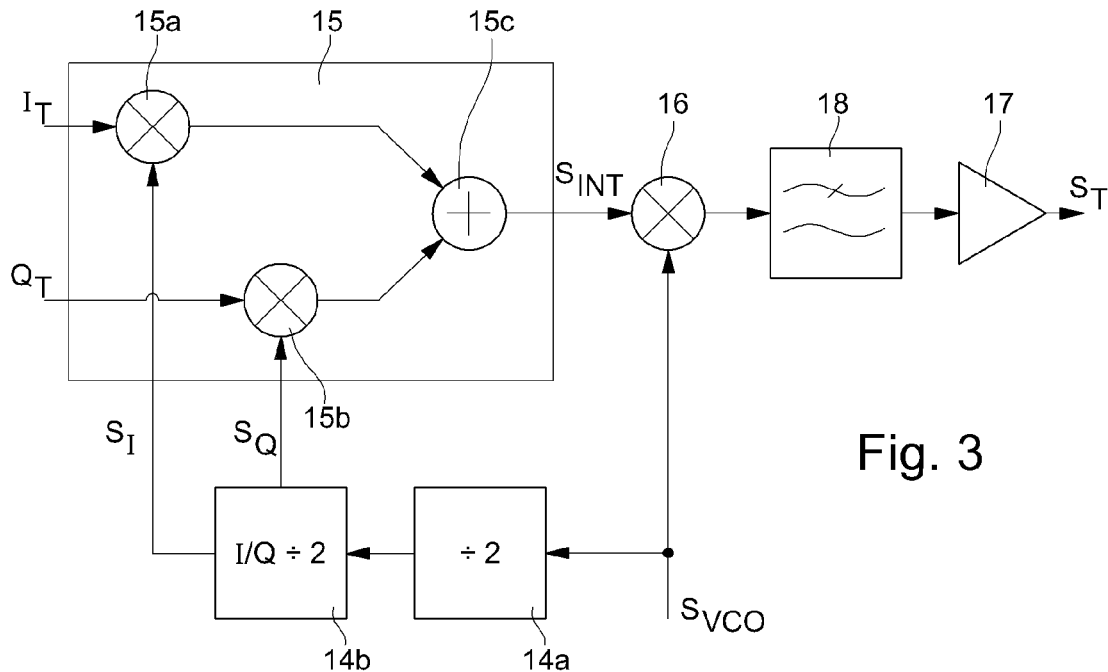
FIG. 3 shows a second embodiment of a part of the device for transmitting radio-frequency signals according to the invention.

In order to transmit radio-frequency signals, the device may also include a third mixer unit 15 for performing a first frequency conversion operation in order to increase the frequency of the baseband signals $I_T$ and $Q_T$. This third mixer unit 15 is formed of two mixers followed by an adder, as shown in FIG. 3 described below, for mixing the second high frequency in-phase and in-quadrature signals $S_D$ respectively with the baseband signals $I_T$ and $Q_T$. Intermediate transmission signals $S_{INT}$ are supplied to the output of the adder of third mixer unit 15, whose frequency corresponds to the frequency of the second high frequency signals $S_D$. The frequency of these intermediate signals is preferably equal to ⅓ of the frequency of the radio-frequency signals to be transmitted $S_T$.

The device further includes a fourth mixer unit 16 for increasing the frequency of the intermediate transmission signals $S_{INT}$ using first high frequency signals $S_{VCO}$ generated by oscillator stage 1. The fourth mixer unit 16 supplies radio-frequency signals, which are amplified by a power amplifier 17. The amplified radio-frequency signals $S_T$ are transmitted by antenna 8 passing through switch element 10 and bandpass filter 9.

FIG. 3 shows a second embodiment of one part of the device for transmitting radio-frequency signals $S_T$. This second embodiment is substantially equivalent to that described with reference to FIG. 1 for the device in transmission mode.

In order to transmit radio-frequency signals, the device includes a third mixer unit 15 for performing a first frequency conversion operation. This first operation increases the frequency of the data signals $I_T$ and $Q_T$ to be transmitted, which are in baseband, i.e. which have a carrier frequency close to 0. This third mixer unit 15 is formed of a first mixer 15a, a second mixer 15b and an adder 15c for adding the signals exiting the first and second mixers.

For this first frequency conversion operation, the frequency of the first high frequency signals $S_{VCO}$ must be divided by 4 by a first divider-by-2 14a and a second master-slave divider-by-2 14b to supply second high frequency signals in-phase $S_I$ and in-quadrature $S_Q$. The first mixer 15a mixes in-phase signals $I_T$ with the second high frequency in-phase signals $S_I$, whereas the second mixer 15b mixes in-quadrature signals $Q_T$ with the second high frequency in-quadrature signals $S_Q$. The signals exiting the first and second mixers 15a and 15b are added in adder 15c in order to supply intermediate transmission signals $S_{INT}$ at an equivalent frequency to the frequency of the second high frequency signals.

A second frequency conversion operation is performed using a fourth mixer unit 16, which receives intermediate signals $S_{INT}$ and first high frequency signals $S_{VCO}$. The carrier frequency of the useful output radio-frequency signals from this fourth mixer unit is ¾ less than the frequency of the first high frequency signals according to the invention. The image frequency of the disturbance signals at the output of this fourth mixer unit whose value is ⅝ the frequency of the radio-frequency signals, may be easily filtered by a lowpass filter 18. Thus, the filtered signals can be amplified without any disturbance signals by the power amplifier 17 in order to supply radio-frequency signals $S_T$ that can be transmitted by the antenna of the device. Without the lowpass filter, the disturbance signals would be amplified in the same way as the useful signals which would waste energy in amplifier 17.

Figure 4:
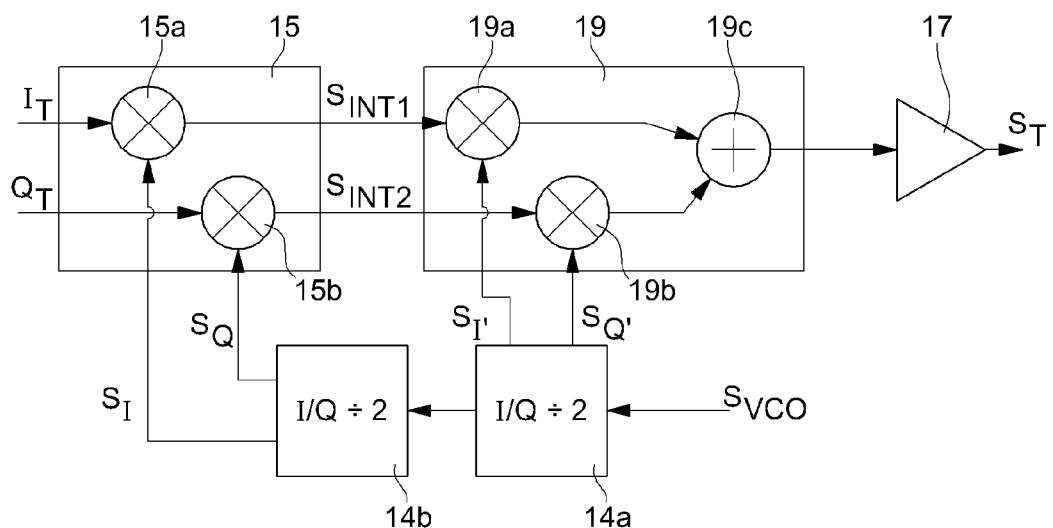
FIG. 4 shows a third embodiment of a part of the device for transmitting radio-frequency signals according to the invention.

FIG. 4 shows a third embodiment of one part of the device for transmitting radio-frequency signals $S_T$.

In order to transmit radio-frequency signals, the device includes a third mixer unit 15 for performing a first frequency conversion operation. This first operation increases the frequency of the data signals $I_T$ and $Q_T$ to be transmitted, which are baseband, i.e. which have a carrier frequency close to 0. This third mixer unit 15 is formed of a first mixer 15a and a second mixer 15b.

For this first frequency conversion operation, the frequency of the first high frequency signals $S_{VCO}$ must be divided by 4 as for the second embodiment. In order to do this the division is performed by a first master-slave divider-by-2 14a, which supplies third high frequency signals in-phase $S_I$ and in-quadrature $S_Q$, followed by a second master-slave divider-by-2 14b receiving the divided in-phase signals from the first divider-by-2. The second divider-by-2 14b thus supplies second high frequency signals in-phase $S_I'$ and in-quadrature $S_Q'$. The first mixer 15a mixes in-phase signals $I_T$ with the second high frequency in-phase signals $S_I'$ to supply first in-phase intermediate transmission signals $S_{INT1}$. The second mixer 15b mixes in-quadrature signals $Q_T$ with the second high frequency in-quadrature signals $S_Q'$ to supply second intermediate transmission in-quadrature signals $S_{INT2}$. The frequency of the first and second intermediate signals is thus equivalent to the frequency of the second high frequency signals.

A second frequency conversion operation is performed using a fourth mixer unit 19. This fourth mixer unit includes a first mixer 19a, a second mixer 19b and an adder 19c for adding the signals supplied by the first and second mixers. The first mixer 19a mixes intermediate in-phase signals $S_{INT1}$ with third high frequency in-phase signals $S_I'$, whereas the second mixer 19b mixes intermediate in-quadrature signals $S_{INT2}$ with the third high frequency in-quadrature signals $S_Q$. The signals exiting the fourth mixer unit are radio-frequency signals which are finally amplified by the power amplifier 17 so that the amplified radio-frequency signals $S_T$ can be transmitted by the antenna of the device.

It should be noted that with this third embodiment of one part of the device for transmitting radio-frequency signals, it is possible to perform an SSB (single side band modulation) type dual conversion modulation. This structure omits the filter for the image frequency before the power amplifier, given that in this case, there is not image frequency to be filtered at the output of the fourth mixer unit 19. It is also advantageous to supply first high frequency signals $S_{VCO}$ whose frequency has to be divided by the first and second dividers 14a and 14b to perform the two frequency conversions precisely. It would however be difficult to provide an oscillator that directly supplies the third high frequency in-phase and in-quadrature signals for mixing in the fourth mixer unit 19.

From the description that has just been given, multiple variants of the low power device for receiving and/or transmitting radio-frequency signals with noise reduction can be devised by those skilled in the art without departing from the scope of the invention defined by the claims. The central frequency of the radio-frequency signals to be picked up could be detected so as to calibrate the oscillator stage for generating the first high frequency signals. The assembly formed by the amplifier and the two mixer units could be used both for the reception and transmission of the radio-frequency signals.

The invention claimed is:

1. A low power radio-frequency signal reception and/or transmission device, said device comprising:
  a bandpass filter for filtering radio-frequency signals picked up or transmitted by an antenna of the device,
  at least one low noise amplifier for amplifying the signals filtered by the bandpass filter,
  an oscillator stage for generating first high frequency signals,
  at least one frequency divider for dividing the frequency of the first high frequency signals by M in order to generate second high frequency signals, where M is an integer number greater than 1,
  at least a first mixer unit for mixing the filtered and amplified radio-frequency signals with the first high frequency signals in order to produce intermediate signals whose frequency is equal to the subtraction between a carrier frequency of the radio-frequency signals and the frequency of the first high frequency signals,
  at least a second mixer unit for mixing the intermediate signals supplied by the first mixer unit with the second high frequency signals in order to produce output signals whose frequency is equal to the subtraction between the frequency of the intermediate signals and the frequency of the second high frequency signals,
  wherein the oscillator stage is configured so as to generate first high frequency signals whose frequency is outside the frequency band of the bandpass filter and higher, by a factor M/N comprised between 1 and 2, than the frequency of the received radio-frequency signals, where N is an integer number greater than 1, where M is greater than N but less than 2·N to reduce the noise linked to the image frequency of the converted signals, and
  wherein, for the transmission of radio-frequency signals, the device includes a third mixer unit, which includes a first mixer for mixing in-phase baseband data signals with the second high frequency in-phase signals to supply intermediate in-phase signals, a second mixer for mixing in-quadrature baseband data signals with the second high frequency in-quadrature signals, to supply intermediate in-quadrature signals, wherein the frequency divider includes a first master-slave divider-by-2 for the first high frequency signals so as to supply third high frequency in-phase signals and in-quadrature and a second master-slave divider-by-2 for supply the second high frequency in-phase and in-quadrature signals, and wherein it includes a fourth mixer unit, which includes a first mixer for mixing the intermediate in-phase signals with the third high frequency in-phase signals, a second mixer for mixing the intermediate in-quadrature signals with the third high frequency in-quadrature signals, and an adder for adding the output signals from the first and second mixers of the fourth unit in order to supply radio-frequency signals to be amplified by a second power amplifier without passing through a lowpass filter and transmitted via the antenna of the device.

2. The device according to claim 1, wherein the frequency of the first high frequency signals is higher than the frequency of the received radio-frequency signals by a factor M/N, where M is a multiple of 2, equal to 4, whereas N is equal to 3 defining a factor equal to 4/3, and wherein the frequency divider is a divider-by-4.

3. The device according to claim 1, wherein the frequency divider is of the master-slave type for generating second high frequency in-phase and in-quadrature signals, and wherein the second mixer unit includes a first mixer for mixing the intermediate signals with the second high frequency in-phase signals to supply in-phase baseband output signals, and a second mixer for mixing the intermediate signals with the second high frequency in-quadrature signals to supply in-quadrature baseband output signals.

4. The device according to claim 1, wherein the stage oscillator includes a reference oscillator unit with a quartz crystal, a phase and frequency detector for comparing the frequency of the reference signals from the reference oscillator with the frequency of the signals from a voltage controlled oscillator, which is divided by a factor n in an oscillator divider, a lowpass filter for producing a control voltage for the voltage controlled oscillator as a function of the comparison of the signals supplied to said detector such that the voltage controlled oscillator generates the first high frequency signals.

5. The device according to claim 4, wherein the oscillator stage is configured to generate first high frequency signals based on detection of the frequency of the radio-frequency signals picked up by the antenna of the device.

6. The device according to claim 1, wherein it includes a switch element between the bandpass filter and the low noise amplifier allowing said device to be placed in a radio-frequency reception mode or in a radio-frequency transmission mode by the same antenna.

* * * * *

UNITED STATES PATENT AND TRADEMARK OFFICE
CERTIFICATE OF CORRECTION

PATENT NO. : 8,213,879 B2  
APPLICATION NO. : 12/282303  
DATED : July 3, 2012  
INVENTOR(S) : Emil Zellweger and Arnaud Casagrande Page 1 of 1

It is certified that error appears in the above-identified patent and that said Letters Patent is hereby corrected as shown below:

On the Title Page Item (30) should read:

Item --(30)   Foreign Application Priority Data

March 9, 2006 (EP) .......................................................06110899.9--

Signed and Sealed this
Sixteenth Day of October, 2012

David J. Kappos
*Director of the United States Patent and Trademark Office*